United States Patent [19]

Newnom

[11] 4,035,859
[45] July 19, 1977

[54] APPARATUS FOR MAKING SELF-LOCKING INTERNALLY THREADED FASTENERS WITH RING-LIKE LOCKING ELEMENTS

[75] Inventor: Richard S. Newnom, Tujunga, Calif.

[73] Assignee: Amerace Corporation, New York, N.Y.

[21] Appl. No.: 680,480

[22] Filed: Apr. 26, 1976

Related U.S. Application Data

[60] Division of Ser. No. 637,989, Dec. 5, 1975, Pat. No. 3,975,787, which is a continuation of Ser. No. 466,499, May 2, 1974, abandoned.

[51] Int. Cl.² .......................... B21D 53/24; B21K 1/64
[52] U.S. Cl. ...................................... 10/72 R; 10/10 P
[58] Field of Search ................... 10/10 R, 10 P, 86 R, 10/86 A; 85/1 C, 10 F; 118/308, 317, 318, 620, 622, 624; 151/7, 14.5; 264/267, 269

[56] References Cited

U.S. PATENT DOCUMENTS

| | | | |
|---|---|---|---|
| 3,061,455 | 10/1962 | Anthony | 151/7 |
| 3,294,139 | 12/1966 | Preziosi | 10/10 P |
| 3,416,492 | 12/1968 | Greenleaf | 151/7 |
| 3,568,746 | 3/1971 | Faroni et al. | 151/7 |
| 3,766,584 | 10/1973 | Dorflinger | 10/86 R |
| 3,830,902 | 8/1974 | Barnes | 264/267 |

Primary Examiner—E. M. Combs
Attorney, Agent, or Firm—S. Michael Bender; Richard A. Craig

[57] ABSTRACT

A self-locking internally threaded fastener in which the self-locking characteristic is derived from a ring-like plastic patch having a circumferential extent of greater than 180° adhered to the thread-defining surface of the fastener. A method for making the fastener includes seating a fastener upon a pin having a configuration which establishes a cavity between the pin and the fastener, placing an initial deposit of plastic powder in the cavity and then re-distributing the plastic powder, as by blowing, to form a ring-like deposit which can be heated until fused to establish the desired ring-like patch. An apparatus includes a pin having a seating shoulder and a frusto-conical tapered portion for receiving the fastener and establishing the cavity.

9 Claims, 12 Drawing Figures

APPARATUS FOR MAKING SELF-LOCKING INTERNALLY THREADED FASTENERS WITH RING-LIKE LOCKING ELEMENTS

This is a division of application Ser. No. 637,989, filed Dec. 5, 1975, now U.S. Pat. No. 3,975,787, which is a continuation of abandoned application Ser. No. 466,499, filed May 2, 1974.

The present invention relates generally to self-locking internally threaded fasteners of the type in which the self-locking characteristic is derived from a plastic patch adhered to the thread-defining surface of the fasteners and pertains, more specifically, to such as fastener wherein the patch has a ring-like configuration and to a method and apparatus for making the fastener.

Self-locking internally threaded fasteners of the type having a self-locking element in the form of a plastic patch adhered to the thread-defining surfaces of the fastener have found wide commercial acceptance, especially in areas where prior self-locking fasteners with plastic locking elements were not an economic feasibility. Various techniques and machines have been developed to enable the economical production of large numbers of internally threaded fasteners wherein a plastic patch is established on the unmodified thread-defining surface of the fastener by depositing plastic powder upon the surface, which powder is fused and adhered to the surface to produce the desired patch. Among the more successful techniques is that in which the fastener is placed upon a pin which masks a greater portion of the thread-defining surface and establishes a cavity which permits the deposit of plastic powder upon a limited portion of the thread and the establishment of a plastic patch of limited axial and circumferential extent. An example of the fasteners, techniques and machinery heretofore available is found in patent application Ser. No. 802,090, filed Feb. 25, 1969, by Gerald Barnes now U.S. Pat. No. 3,830,902.

Certain disadvantages have been experienced with fasteners of the type described, as well as with the methods and apparatus employed in their manufacture. For example, the limited circumferential extent of the plastic patch provides only a concomitant limited area of adherence between the patch and the thread of the fastener. Thus, where the presence of foreign matter, such as water, at the interface between the patch and the thread-defining surface tends to come between the patch and the area of the surface to which the patch is adhered, total adherence is diminished, sometimes to an unacceptable level. Increasing the size of the patch can increase the area of adherence; however, the axial extent is limited by the requirement that the patch be spaced from the ends of the thread in order to provide the desired lead-on thread at each end of the fastener.

It has been found that with methods and apparatus utilizing pins upon which the fasteners are seated during the establishment of plastic patches on the fasteners, the pins will wear, allowing uncontrolled distribution of powder upon the thread-defining surface, even to the extent where the desired clear lead-on thread has not been preserved. However, the use of pins still has proved to be highly effective in producing reliable results.

It is therefore an object of the invention to provide an improved self-locking internally threaded fasteners in which the self-locking characteristic is derived from a plastic patch adhered to the thread-defining surface of the fastener, and wherein the circumferential extent of the patch is not limited to a relatively small arc, but continues further to establish a ring-like patch which extends over an arc greater than 180° and thus has a circumferential extent of about 360°.

Another object of the invention is to provide a method and apparatus which enables the economical manufacture of a serviceable self-locking internally threaded fastener in which the self-locking characteristic is derived from a ring-like plastic patch adhered to the thread-defining surface of the fastener.

Still another object of the invention is to provide a method and apparatus which enables the advantageous use of pins for receiving internally threaded fasteners within which will be established a ring-like plastic patch which will serve effectively as a self-locking element.

A further object of the invention is to provide an improved self-locking fastener which can be produced successfully, utilizing techniques and machinery which are relatively simple modifications of techniques and machinery now in use for the manufacture of self-locking internally threaded fasteners having plastic patches of limited circumferential extent.

A still further object of the invention is to provide a self-locking internally threaded fastener wherein the self-locking characteristic is derived from a ring-like plastic patch produced economically by a method and apparatus utilizing the technique of seating each fastener upon a pin of prescribed configuration and placing plastic powder within the fastener on a pin in such a way as to establish a ring-like distribution of plastic powder which is then fused and adhered to the thread-defining surface of the fastener.

The above objects, as well as still further objects and advantages, are attained by the invention which may be described briefly as a method of making a self-locking internally threaded fastener in which the self-locking characteristic is derived from a ring-like plastic patch having a circumferential extent of greater than 180° adhered to the thread-defining surface of the fastener, the method comprising seating the fastener upon a pin having a cavity-forming portion such that the pin is received within the fastener with the portion of the pin and a portion of the thread-defining surface of the fastener establishing a cavity having a circumferential extent of greater than 180°, subsequently placing an initial deposit of plastic powder upon a portion of the thread-defining surface within the cavity, subsequently re-distributing the plastic powder within the cavity to establish a ring-like deposit of plastic powder having a circumferential extent of greater than 180°, and heating the fastener to fuse the ring-like deposit and establish a ring-like patch adhered to the thread-defining surface. Further, the invention includes apparatus for practicing the method and a self-locking internally threaded fastener made in accordance with the method.

The invention will be more fully understood, while still further objects and advantages will become apparent, in the following detailed description of preferred embodiments illustrated in the accompanying drawing, in which.

Figure 1:
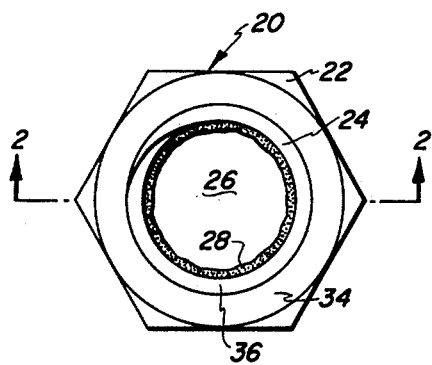
FIG. 1 is a plan view of an internally threaded fastener in the form of a nut constructed in accordance with the invention.
Figure 2:
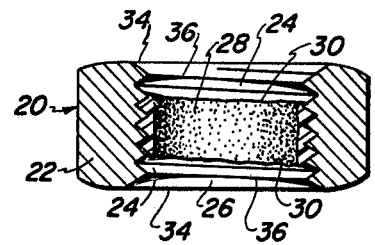
FIG. 2 is a cross-sectional view taken along line 2—2 of Fig. 1.

Referring now to the drawing, and in particular to FIGS. 1 and 2 thereof, a self-locking internally threaded fastener constructed in accordance with the invention is illustrated in the form of nut 20 having a solid body 22 with a thread-defining surface 24 extending axially along an aperture 26 through the body. The self-locking characteristic is derived from a self-locking element in the form of a ring-like plastic patch 28 adhered to the unmodified thread-defining surface 24. The plastic patch 28 has a limited axial extent, the length of the patch being confined axially, or longitudinally, between laterally extending longitudinal boundaries 30. Each of the longitudinal boundaries 30 is spaced from a corresponding end 34 of the thread-defining surface so as to provide a lead-on thread 36 at each end of the nut for facilitating the initial engagement of nut 20 with a mating threaded stud without interference from the patch.

The patch 28 is continuous and extends circumferentially around the entire perimeter of aperture 26. Such a full 360° circumferential extent not only provides the desired self-locking characteristic, but enables the patch to serve as an integral seal when the nut 20 is applied to a mating stud. Of major importance is the provision of a larger area of contact between patch 28 and the thread-defining surface 24, as compared to the corresponding surface area available in fasteners having patches of limited circumferential extent (as illustrated in the aforementioned U.S. Pat. No. 3,830,902). Such a larger area of contact assures that even in the presence of voids or entrapped water at the interface between the patch and the thread-defining surface, more than sufficient surface area remains to assure effective adherence of the patch 28 to the thread-defining surface 24.

Figure 3:
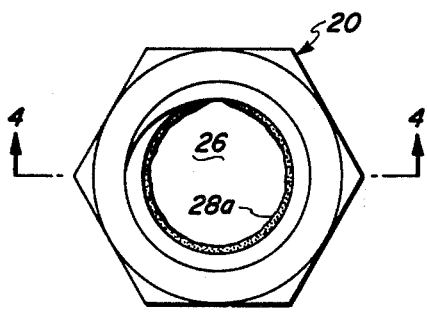
FIG. 3 is a plan view of another internally threaded fastener in the form of a nut, illustrating another embodiment of the invention.
Figure 4:
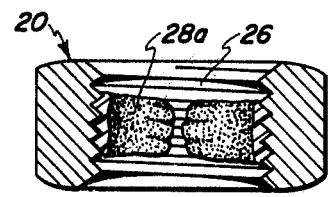
FIG. 4 is a cross-sectional view taken along line 4—4 of Fig. 3.

The above advantages are attained even where the patch does not extend fully around the entire periphery of the aperture 26 of the nut 20. Thus, as illustrated in FIGS. 3 and 4, an alternate patch 28a extends continuously around the periphery of aperture 26, but does not close completely so that the circumferential extent of the patch 28a is somewhat less than the full 360° of patch 28. In actuality, adequate self-locking characteristics together with effective adherence of the patch to the thread-defining surface can be obtained where the patch extends circumferentially in excess of 180°. Thus, in describing the circumferential extent of the patch herein, the term "ring-like" will be used to denote patches which extend circumferentially continuously over an arc greater than 180° and include a patch which extends circumferentially for the full 360°.

Figure 5:
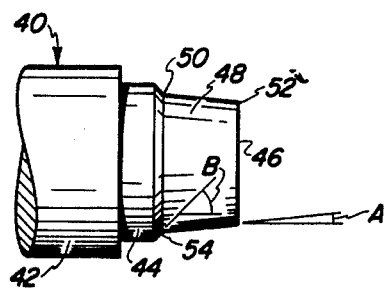
FIG. 5 is a side elevational view of a pin for making a self-locking fastener in accordance with the invention.
Figure 6:
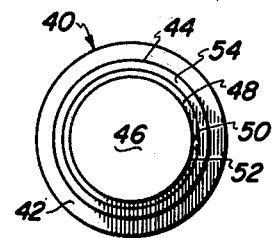
FIG. 6 is an end elevational view of the pin.

Turning now to FIGS. 5 and 6, the apparatus and method employed to fabricate the above-described nuts utilize a pin 40 which will received within a standard nut during patch-applying operations. Pin 40 is seen to include a shank 42 which will be affixed to an endless conveyor belt in a manner similar to that disclosed in the aforementioned U.S. Pat. No. 3,830,902. A cylindrical shoulder 44 extends axially from the shank 42 and has an external diameter complementary to the internal diameter of aperture 26 of nut 20. The portion of the pin which projects axially from the shoulder 44 to the terminal end 46 of the pin 40 includes a frusto-conical surface 48 which tapers from a larger diameter 50 juxtaposed with the shoulder 44 to a smaller diameter 52 at the terminal end 46. The larger diameter 50 is somewhat smaller than the external diameter of shoulder 44 so that there is a lateral step 54 between the shoulder and the frusto-conical surface 48. The frusto-conical surface 48 tapers at an angle A to the longitudinal axis of the pin while the step 54 makes an angle B to the axis. Preferably, angle A is about 5° and angle B is about 45°.

Figure 7:
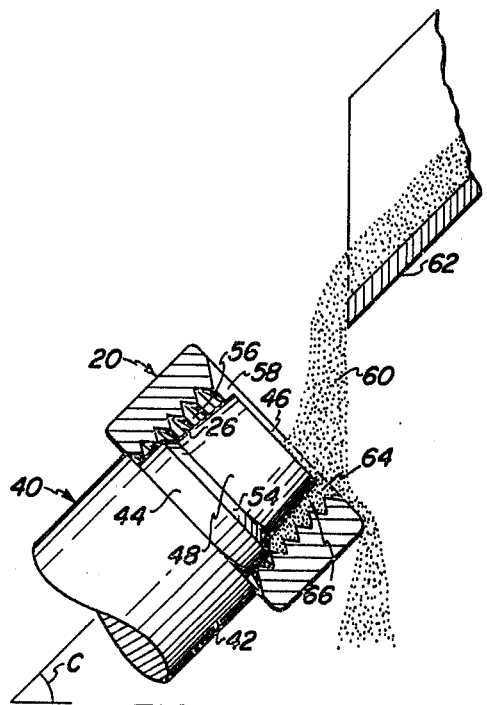
FIG. 7 is a side elevational view showing a fastener located on a pin during one step of the manufacture of a self-locking fastener in accordance with the invention.
Figure 8:
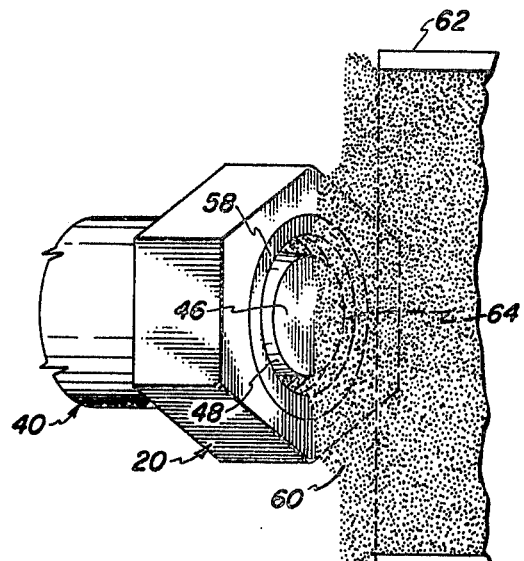
FIG. 8 is a plan view of the operation and apparatus shown in Fig. 7.

Referring now to FIGS. 7 and 8, nut 20 is fabricated by placing a standard nut upon a pin 40 such that the nut is seated upon shoulder 44 of the pin, with the nut resting against the shank 42. Placement of the nut upon the pin is facilitated by the frusto-conical surface 48 which serves as a pilot to properly engage the nut with the pin with minimal resistance.

Once the nut is seated upon the pin, the frusto-conical surface 48 and the thread-defining surface 24 of the nut establish an annular cavity 56 having a circumferential extent of 360° and bounded by the step 54. Thus, the cavity 56 is closed by the cylindrical shoulder 44, which masks at least one thread at the corresponding end of the nut, and has an opening 58 at the other end of the nut.

The pin is then held at angle C to the horizontal, angle C preferably being in the range of about 30° to about 50°, and is passed through a curtain of falling plastic powder 60, in the direction perpendicular to the paper as viewed in FIG. 7. The plastic powder 60 falls from a trough 62 which is located above the lower portion 64 of the opening 58 to cavity 56 so that plastic powder 60 will enter the cavity to establish an initial deposit 66 of plastic powder in the cavity on the thread-defining surface of the nut. Preferably, initial deposit 66 is in excess of the amount of powder required for patch 28.

Figure 9:
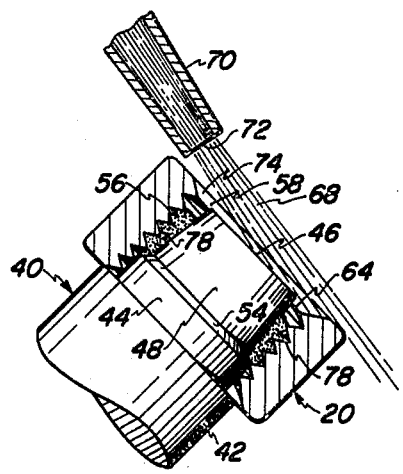
FIG. 9 is a side elevational view illustrating a subsequent operation of a further portion of the apparatus of the invention.
Figure 10:
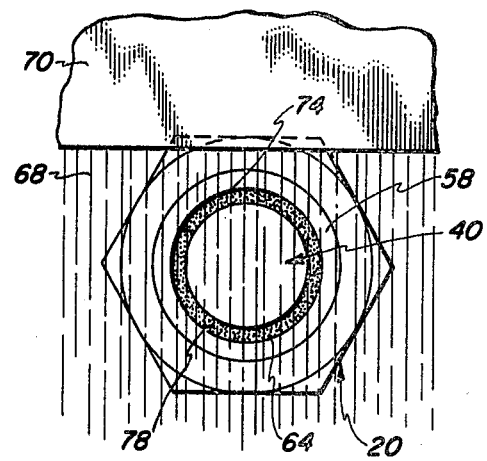
FIG. 10 is a plan view of the operation and apparatus shown in Fig. 9.

In order to properly distribute the correct amount of plastic powder within the cavity 56, the pin 40, with the nut 20 thereon, is passed through a stream 68 of gas, in this instance the gas being air, emanating from a nozzle 70, as seen in FIGS. 9 and 10. Nozzle 70 has an elongate orifice 72 which is oriented parallel to the path of travel of the pin so that the pin and nut are exposed to the stream 68 for a finite, extended length of time. The nozzle 70 itself is so oriented relative to the axis of the pin 40 as to direct the stream 68 more-or-less across the opening 58 at 74, as well as into the cavity 56 at 64. The combined effect of the positive pressure of the air stream in the cavity adjacent 64 and the negative pressure, or partial vacuum, created in the cavity adjacent 74, together with the pin configuration and the helical configuration of the thread of the nut will enable the blowing operation to remove excess plastic powder from the deposit and to cause a swirling action within the cavity 56 which results in re-distribution of the plastic powder from the initial deposit 66 to a ring-like deposit 78. Empirical observations confirm that this combined effect produces a ring-like deposit 78 which enables the fabrication of a completed ring-like patch having unique characteristics especially well-suited to the performance of self-locking functions.

The ring-like deposit 78 will adhere sufficiently to the thread-defining surface to remain in the ring-like configuration as the pin 40 and nut 20 are transported to the next station in the apparatus. Depending upon variations in the air stream velocity and orientation as well as nut and cavity size, the amount of plastic powder in the initial deposit and other factors, the ring-like deposit 78 can take the form of a full 360° ring to establish ring patch 28, or can have a gap to establish ring patch 28a. In the latter instance, the gap ordinarily will occur at the lower portion of cavity 56, adjacent 64. Because of the minimal resistance to proper seating of the nut, attained by the taper of the frusto-conical surface 48, pin wear is reduced from that experienced with pins such as those illustrated in the aforementioned U.S. Pat. No. 3,830,902, thus enabling increased control of the deposit and distribution of powder upon the thread-defining surface of the nut, as well as preservation of the desired lead-on thread at each end of the nut.

Figure 11:
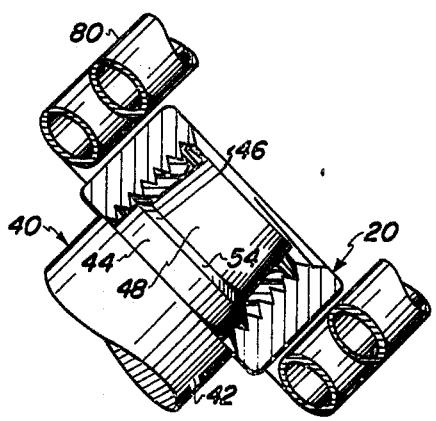
FIG. 11 is a side elevational view illustrating a further subsequent operation and a still further portion of the apparatus.

Subsequently, the pin 40, with the nut 20 thereon and the ring-like deposit 78 established in the cavity, is passed into the field of an induction heater 80, as seen in FIG. 11, which will heat the nut to fuse, or melt, the plastic powder of deposit 78.

Figure 12:
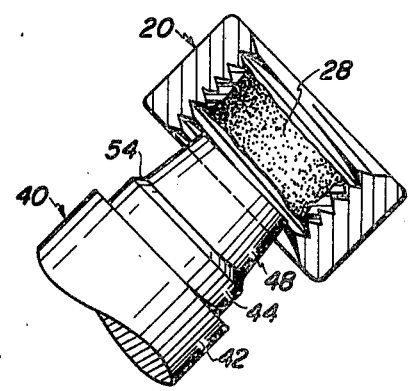
FIG. 12 is a side elevational view illustrating a still further subsequent operation.

Upon cooling, the fused deposit will solidify to establish the desired ring-like patch 28 or 28a adhered to the thread-defining surface of the nut, and the completed nut 20 can be removed from the pin 40, as illustrated in FIG. 12.

In the preferred examples, a polyamide resin powder, specifically nylon 11, was used as the patch material and provided initial and reuse torques well within the values necessary to qualify the product as a reusable self-locking nut. Other resiliently deformable plastic materials possessing also certain other essential characteristics and properties as set forth in the aforementioned U.S. Pat. No. 3,830,902, may be used in place of the polyamide resin powder. In addition, a primer coating (not shown) of synthetic organic resin material, such as described in U.S. Pat. No. 3,568,746, granted Mar. 9, 1971, to Charles C. Faroni et al., can be used in conjunction with the present invention.

Pin 40 is constructed of a material to which the fused plastic powder and completed plastic patch will not adhere strongly enough to interfere with the described process. Thus, fluoroplastic resins are feasible, as are certain metals, such as aluminum.

It is to be understood that the above detailed description of embodiments of the invention is provided by way of example only. Certain details of design and construction may be modified without departing from the true spirit and scope of the invention as set forth in the appended claims.

The embodiments of the invention in which an exclusive property or privilege is claimed are defined as follows:

1. Apparatus for converting a nut having an imperforate wall providing the nut with external wrenching surfaces and an internal thread-defining surface open at both ends into a self-locking nut of the prevailing torque type in which the self-locking characteristic is derived from a patch of plastic material adhered to said thread-defining surface, said patch being of a predetermined circumferential extent which is greater than 180° and further being axially limited so as to be spaced from both axial ends of said thread-defining surface, said apparatus comprising:

a pin having a cavity-forming portion having a circumferential extent which is at least as great as said predetermined circumferential extent;

means for seating the nut, either end first, upon said pin such that the pin enters one of the open ends of the thread-defining surface so that the pin is received within the thread-defining surface of the nut with said portion of the pin and a portion of the thread-defining surface of the nut establishing a cavity having an opening at the other open end of the thread-defining surface of the nut, the cavity further having a circumferential extent at least as great as said predetermined circumferential extent;

means for thereupon inserting a quantity of powder of said plastic material through said opening into said cavity and upon a portion of the thread-defining surface of the nut, to establish an initial deposit having at least predominantly a circumferential extent which is less than 180° and which is significantly less than said predetermined circumferential extent;

means for subsequently, and while said nut remains seated upon said pin, re-distributing plastic powder within the cavity to increase the circumferential extent of the powder within the cavity to increase the circumferential extent of the powder to establish a final deposit of plastic powder substantially having said predetermined circumferential extent; and means for thereupon heating the nut to fuse the final deposit and establish said patch.

2. The apparatus of claim 1 wherein the re-distributing means include means for blowing the plastic powder within the cavity.

3. The apparatus of claim 2 wherein the pin includes a terminal end, the cavity has an opening at the terminal end of the pin and the blowing means include means for directing a stream of gas across and into the opening such that the initial deposit of plastic powder is displaced by the action of the gas to establish the final deposit.

4. The apparatus of claim 3 wherein the pin has its axis inclined at a predetermined angle to the horizontal when located at the powder inserting means and at the powder re-distributing means and the powder inserting means drops powder into said cavity.

5. The apparatus of claim 4 wherein said angle is between about 30° and about 50 .

6. The apparatus of claim 3 wherein the pin includes a cylindrical shoulder opposite to the terminal end thereof for receiving the fastener in seated relationship therewith and the cavity-forming portion of the pin includes a frusto-conical surface tapered from a larger diameter juxtaposed with the shoulder to a smaller diameter at the terminal end.

7. The apparatus of claim 6 wherein the frusto-conical surface extends at an angle of about 5° to the axis of the pin.

8. The apparatus of claim 7 wherein the pin includes a lateral step between the shoulder and the frusto-conical surface.

9. The apparatus of claim 8 wherein the lateral step extends laterally at an angle of about 45° to the axis of the pin.

* * * * *